United States Patent
Arai

(10) Patent No.: US 9,715,738 B2
(45) Date of Patent: Jul. 25, 2017

(54) INFORMATION PROCESSING APPARATUS RECOGNIZING MULTI-TOUCH OPERATION, CONTROL METHOD THEREOF, AND STORAGE MEDIUM

(71) Applicant: CANON KABUSHIKI KAISHA, Tokyo (JP)

(72) Inventor: Tsunekazu Arai, Tama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/866,633

(22) Filed: Sep. 25, 2015

(65) Prior Publication Data

US 2016/0093038 A1    Mar. 31, 2016

(30) Foreign Application Priority Data

Sep. 29, 2014    (JP) .................................. 2014-199181

(51) Int. Cl.
| | |
|---|---|
| *G06K 9/00* | (2006.01) |
| *G06T 7/20* | (2017.01) |
| *G06F 3/01* | (2006.01) |
| *G06F 3/042* | (2006.01) |
| *G06T 7/70* | (2017.01) |

(Continued)

(52) U.S. Cl.
CPC ................ *G06T 7/20* (2013.01); *G06F 3/017* (2013.01); *G06F 3/0425* (2013.01); *G06K 9/00375* (2013.01); *G06T 7/292* (2017.01); *G06T 7/70* (2017.01); *G06T 7/90* (2017.01); *G06T 2207/10016* (2013.01); *G06T 2207/10024* (2013.01); *G06T 2207/10028* (2013.01); *G06T 2207/10048* (2013.01); *G06T 2207/30242* (2013.01)

(58) Field of Classification Search
CPC ................ G06K 9/00; G06F 3/00; G06T 7/00
USPC ........ 382/103, 107, 236; 348/154, 155, 169, 348/170, 171, 172, 352; 345/173
See application file for complete search history.

(56) References Cited

U.S. PATENT DOCUMENTS

| | | | | |
|---|---|---|---|---|
| 8,917,245 | B2 * | 12/2014 | Nagai | ..................... G06F 3/041 345/173 |
| 9,122,353 | B2 * | 9/2015 | Dong | ..................... G06F 3/0425 |

(Continued)

FOREIGN PATENT DOCUMENTS

JP         2014-16795 A        1/2014

*Primary Examiner* — Abolfazl Tabatabai
(74) *Attorney, Agent, or Firm* — Canon U.S.A., Inc. IP Divsion

(57) ABSTRACT

Conventionally, when an input operation is recognized based on a three-dimensional measurement of user's hands, it was difficult to discriminate whether a plurality of detected hands is a pair of hands of a user or a plurality of users. An information processing apparatus according to the present invention includes an image acquiring unit configured to acquire information about an image capturing a space on an operation surface, a position identifying unit configured to identify the position where each of a plurality of objects to be used for an operational input has entered into the space based on information about the acquired image, and an association unit configured to identify a combination of a plurality of objects based on the position identified for each of the plurality of objects and associate the combined plurality of objects with each other.

21 Claims, 11 Drawing Sheets

(51) Int. Cl.
    *G06T 7/292*     (2017.01)
    *G06T 7/90*     (2017.01)
    *G06F 3/041*     (2006.01)

(56) References Cited

U.S. PATENT DOCUMENTS

2009/0324008 A1   12/2009  Kongqiao et al.
2012/0086659 A1    4/2012  Perlin et al.
2012/0249416 A1   10/2012  Maciocci et al.

\* cited by examiner

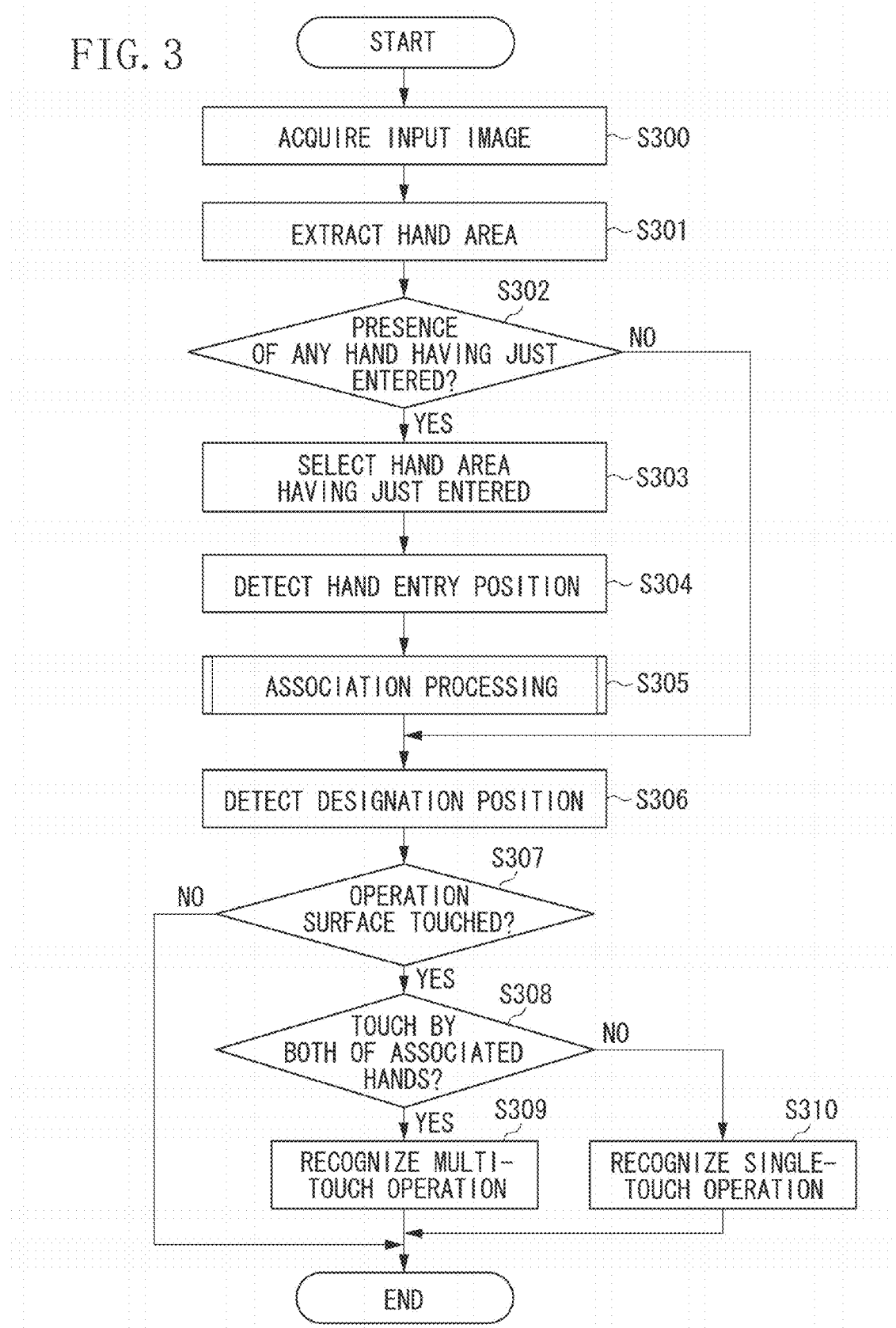

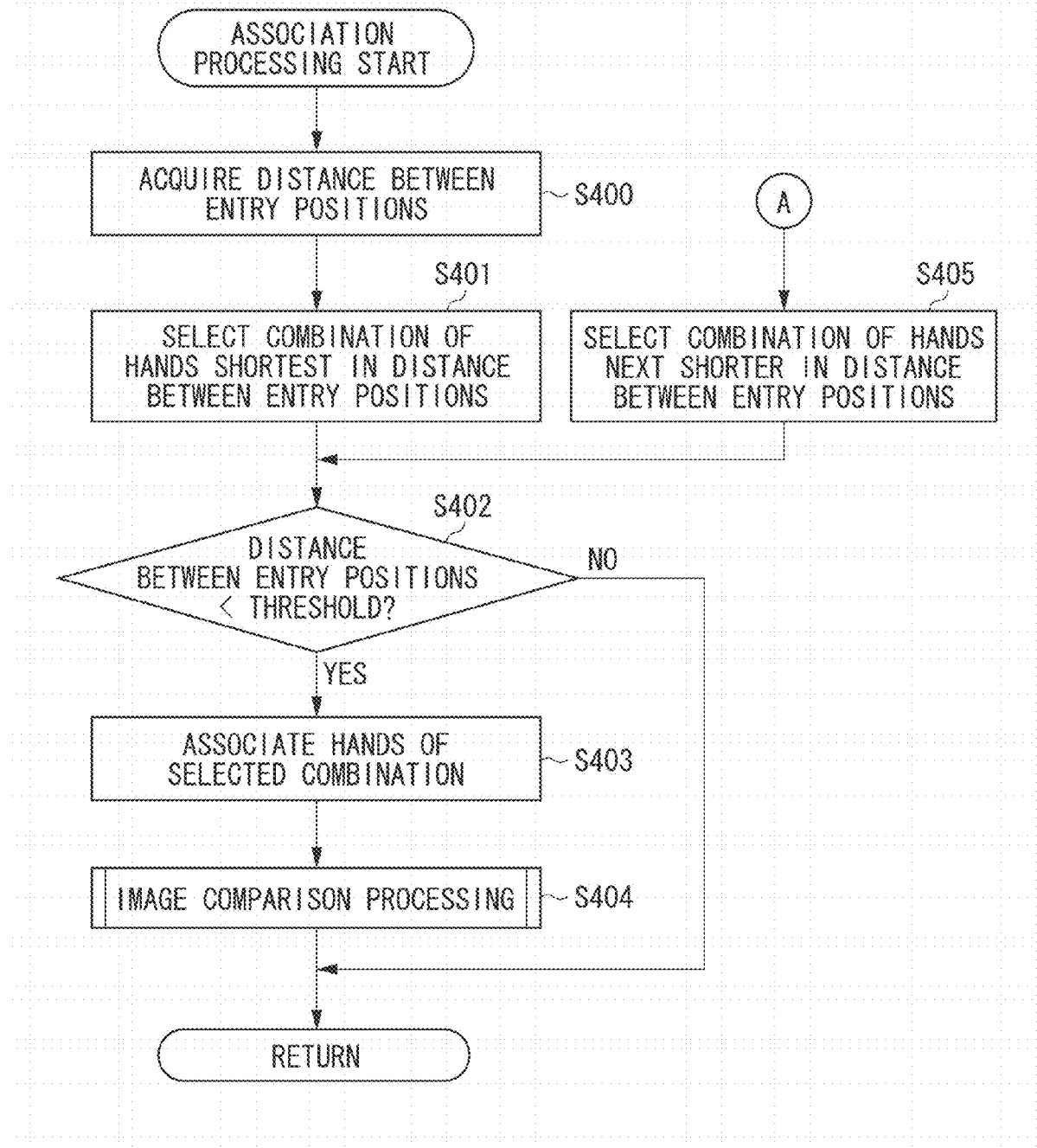

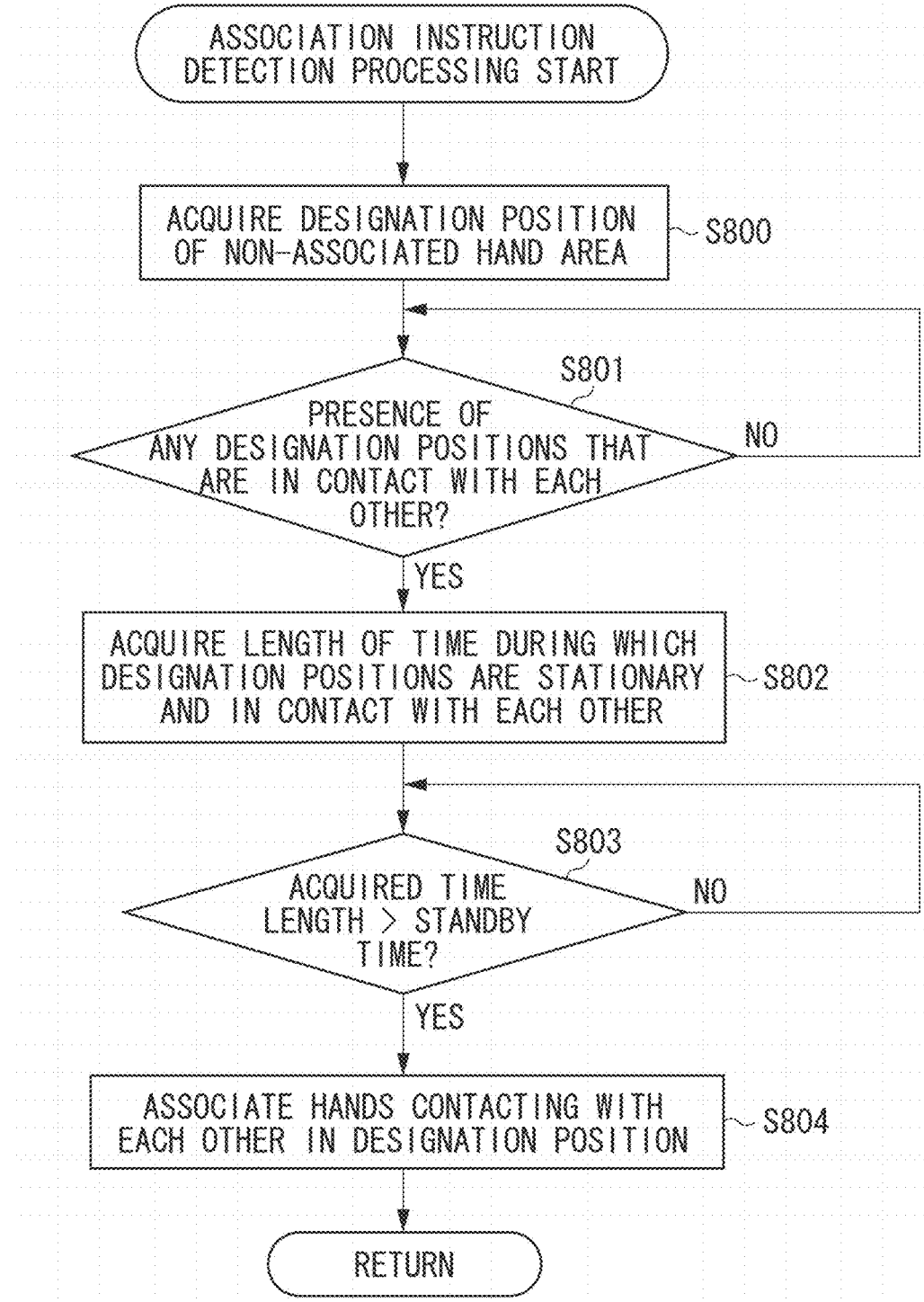

INFORMATION PROCESSING APPARATUS RECOGNIZING MULTI-TOUCH OPERATION, CONTROL METHOD THEREOF, AND STORAGE MEDIUM

BACKGROUND OF THE INVENTION

Field of the Invention

The present invention relates to a technique capable of recognizing a multi-touch operation.

Description of the Related Art

In a user interface (UI) allowing users to input instructions via a touch panel, a multi-touch operation is generally used, which is an operation to perform input in cooperation with a plurality of touch positions with each other. In a case where a system is configured to enable a plurality of users to simultaneously perform operations, it is necessary to discriminate whether a plurality of detected touch positions has been input by a single user with intention to perform a multi-touch operation or unintentionally input by a plurality of users.

As discussed in Japanese Patent Application Laid-Open No. 2014-16795, it is feasible to discriminate an input by a single user from an input by a plurality of users based on the direction of each finger that can be estimated with reference to an area size and a shape of each finger that contacts the touch panel.

As a recently available technique, it is conventionally known to extract an area including a specific object (e.g., user's hand) from an image captured by a visible light camera, an infrared ray camera, or a range image sensor and recognize a gesture having been input as a user interface (UI) operation based on the movement and position of the specific object. Such a system is configured to acquire a distance from a finger to a touch target surface (e.g., a wall or a table) by measuring a three-dimensional position of the finger, and determine the presence of any contact based on the acquired distance value.

Even in the above-mentioned touch system, it is desired that a user can input a multi-touch operation. However, as discussed in Japanese Patent Application Laid-Open No. 2014-16795, it is unfeasible to obtain information about a finger contact surface from an arbitrary wall or table. Further, in a case where the system is sufficiently large in size and enables a plurality of users to simultaneously perform operations, each user can flexibly operate the system from various angles. Accordingly, even if the direction of a finger is detectable at a portion other than the touch panel, it is difficult to obtain an accurate identification result because there is not so large difference in direction angle between fingers of a plurality of users if the users are positioned adjacently.

SUMMARY OF THE INVENTION

According to an aspect of the present invention, an information processing apparatus includes an image acquisition unit configured to acquire information about an image capturing a space on an operation surface, an identifying unit configured to identify a position where each of a plurality of objects to be used for an operational input has entered into the space based on the information about the image acquired by the image acquisition unit, and an association unit configured to identify a combination of a plurality of objects, among the plurality of objects, that cooperatively input a single instruction based on the position identified for each of the plurality of objects and configured to associate the combined plurality of objects with each other.

Further features of the present invention will become apparent from the following description of exemplary embodiments with reference to the attached drawings.

BRIEF DESCRIPTION OF THE DRAWINGS

FIG. 3 is a flowchart illustrating an example flow of touch operation recognition processing that can be performed by the information processing apparatus.

FIGS. 4A and 4B are flowcharts each illustrating an example flow of single user hand association processing that can be performed by the information processing apparatus.

FIG. 8 is a flowchart illustrating an example flow of association instruction detection processing that can be performed by the information processing apparatus.

DESCRIPTION OF THE EMBODIMENTS

Hereinafter, information processing according to exemplary embodiments of the present invention will be described in detail below with reference to attached drawings. The configurations described in the exemplary embodiments are mere examples. The scope of the present invention is not limited to the illustrated configurations.

In the information processing according to a first exemplary embodiment, a position of user's hand at an entry of the hand into a space in which a gesture operation or a touch operation performed by a user can be recognized is detected as an entry position and the entry position is stored. If a plurality of detected hands is present in the space, it is discriminated whether the detected hands are the hands of a single user or unrelated hands of a plurality of users based on a positional relationship between the entry positions. Then, the information processing associates a plurality of hands to each other if they can be estimated as two hands of a single user, and recognizes one cooperative operation that is performed by the associated hands. The cooperative operation performed by the associated hands includes, for example, a multi-touch operation for inputting a command based on a plurality of touch positions and a gesture operation for input a command based on a combined movement of a plurality of hands.

Figure 1A:
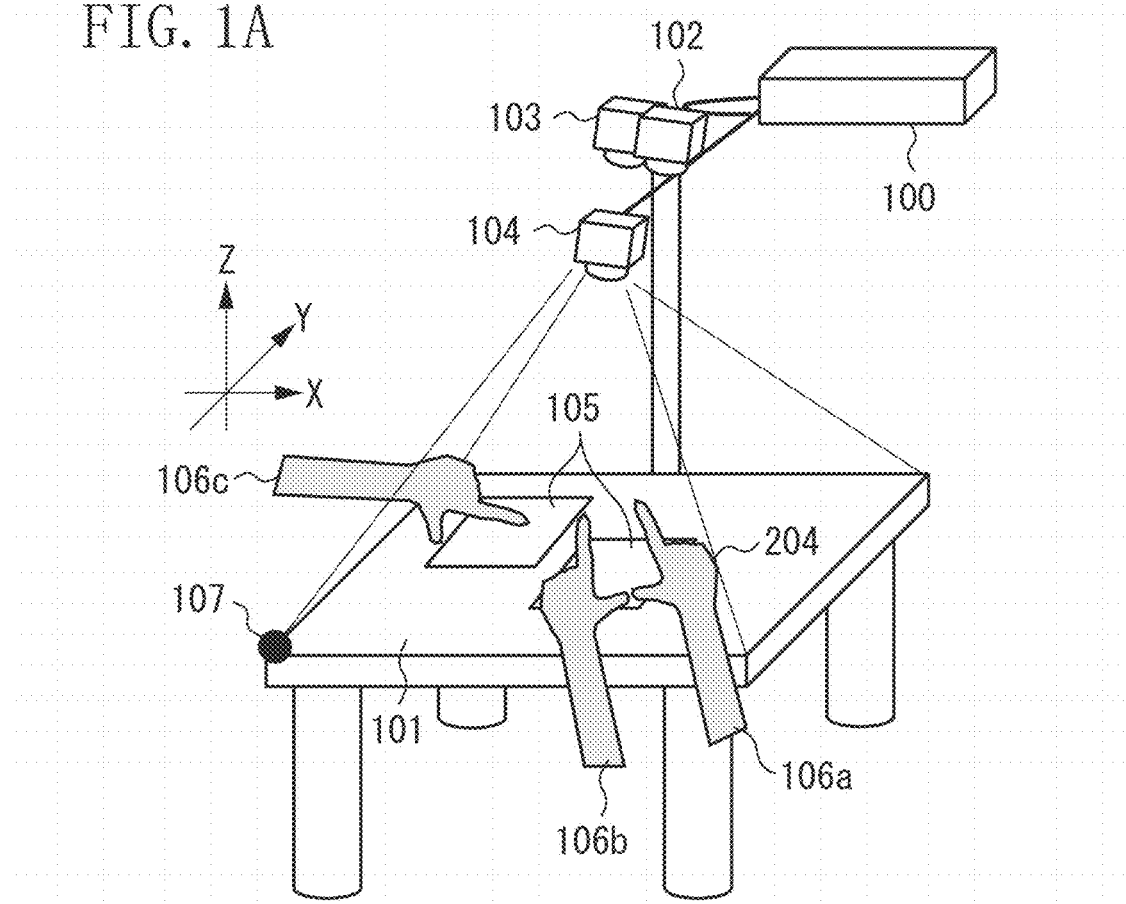
FIG. 1A illustrates an appearance of a tabletop interface equipped with an information processing apparatus installed thereon.

FIG. 1A illustrates an example of an appearance of a tabletop interface system equipped with an information processing apparatus 100 according to the present exemplary embodiment. Further, FIG. 1A illustrates coordinate axes that can be used to define positional information. An operation surface 101 is a table portion of a tabletop interface. Each user can perform a touch operation by touching the operation surface 101. In the present exemplary embodiment, a range image sensor 102 is installed above the operation surface 101 in such a way as to overlook the operation surface. Pixel values of a range image captured by the range image sensor 102 reflect the distance from the range image sensor 102 to the operation surface 101. The captured range image can be input, as an input image, to the information processing apparatus 100. The information processing apparatus 100 can acquire a three-dimensional position of hands of a user by analyzing the input image and recognize an operation performed by the user. A sensor used in the present exemplary embodiment can acquire distance information with reference to a reflection pattern (or reflection time) of an infrared ray. Further, in the present exemplary embodiment, a visible light camera 103 is also installed in such a way as to overlook the operation surface 101 from above. The information processing apparatus 100 can control the visible light camera 103 in such a way as to function as a document camera capable of capturing an image of an object placed on the operation surface 101. The information processing apparatus 100 can detect an imaging target object in a space on the operation surface 101 based on the visible light image obtained by the visible light camera 103 and the range image obtained by the range image sensor 102 and can identify the detected object. For example, the imaging target object includes each hand of a user, a document (e.g., a paper medium or a book), and other three-dimensional object. However, according to the system illustrated in FIG. 1A, a user's head that is present outside the table is not included in an angle of view of each of the range image sensor 102 and the visible light camera 103. Further, it is unnecessary to position the range image sensor 102 and the visible light camera 103 at higher positions if any other configuration is employable to capture an image of the operation surface 101 from above. For example, it will be useful to employ a configuration capable of capturing an image based on light reflected by a mirror.

A projector 104 can project an image on an upper surface of the operation surface 101. In the present system, a user performs a touch operation or a gesture operation on an item 105 included in the projected image. In the present exemplary embodiment, the image to be used in detection of a user's hand and recognition of an operation is a range image. Further, detecting a flesh color area from a visible light image is useful to detect a human hand from an image. In the present exemplary embodiment, using the range image is advantageous in that the system is less influenced even when the color of a user's hand changes due to influence of light projected by the projector 104. Further, instead of using the projector 104, it is feasible to constitute the operation surface 101 by a liquid crystal display device that can serve as a display apparatus of the present system.

In the present exemplary embodiment, to obtain positional information, x, y, and z axes are defined in a three-dimensional space positioned on the operation surface 101, as illustrated in FIG. 1A. More specifically, the origin is set on a point 107. An x-y plane is parallel to the upper surface of the table. A positive direction of the z axis extends upward from the table upper surface. The z axis direction in the present exemplary embodiment corresponds to a height direction in a world coordinate system. However, the present exemplary embodiment is applicable to another system in which the operation surface 101 is constituted by a white board, a wall surface, or any other surface that is not horizontal.

Figure 1B:
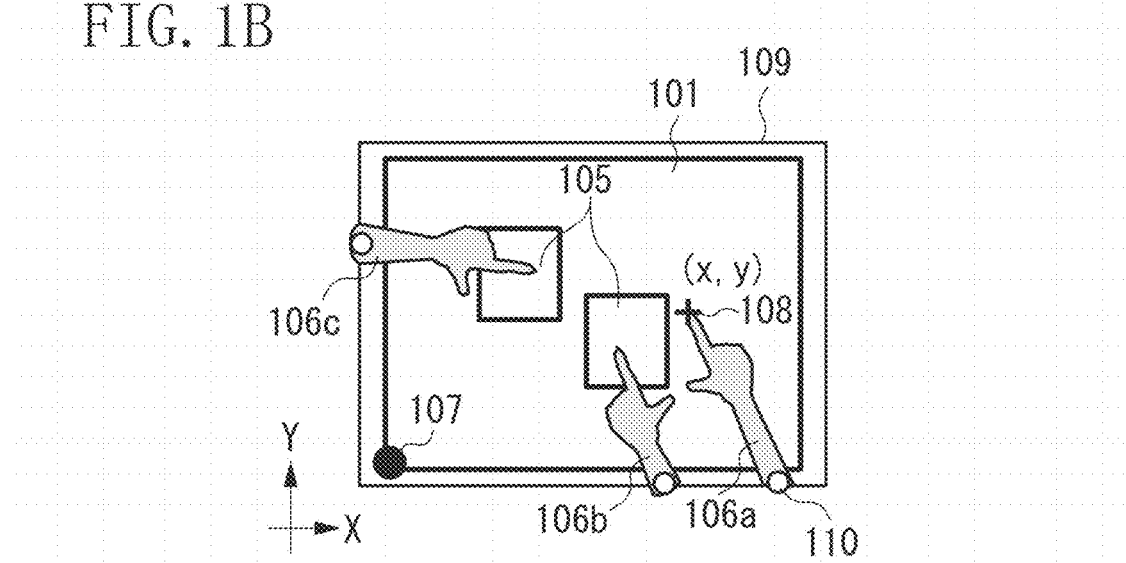
FIG. 1B illustrates an example of an operation environment.

FIG. 1B is a view illustrating a state of the operation surface 101 seen from above. A range inside a borderline 109 illustrated in FIG. 1B corresponds to the angle of view of the range image sensor 102 or the visible light camera 103. Hereinafter, the borderline 109 surrounding the range is referred to as "imageable border". In the illustrated example, a hand 106a and a hand 106b are two hands of a first user and a hand 106c is a single hand of another user B. As mentioned above, in the present exemplary embodiment, a plurality of users can simultaneously input operational instructions. In the present exemplary embodiment, the system can identify a designated position based on the detection of each hand. The designated position can be represented by coordinate values of an estimated position that a user wants to instruct by the hand. In the present exemplary embodiment, the designated position identified by the system is a position that can be estimated as a fingertip. More specifically, the system extracts an area in which an imaged hand is present (hereinafter, simply referred to as "hand area") from a range image and obtains coordinate values of a pixel (i.e., a designated position) included in the hand area and positioned farthest from the imageable border 109. For example, the system identifies a point 108 farthest from the imageable border 109 as a designated position of the hand 106a. Further, a hand entry position defined in the present exemplary embodiment is the center of an intersectional region where the hand area crosses with the imageable border 109 in a frame in which the hand area has been initially detected. More specifically, the entry position is a position where the hand has first entered into the angle of view after a user started an operation. If it is feasible to obtain information about the position where the hand has first appeared after the starting of the operation by the user, the system needs not identify entry position from the first frame in which extraction of the hand area becomes feasible and can identify the entry position from an image that follows the first frame. A point 110 is the entry position of the hand 106a. In the present exemplary embodiment, when a plurality of hands is detected, the system determines whether the detected hands are a pair of hands of a single user or unrelated hands of a plurality of users, based on the positional relationship between respective entry positions.

Figure 2A:
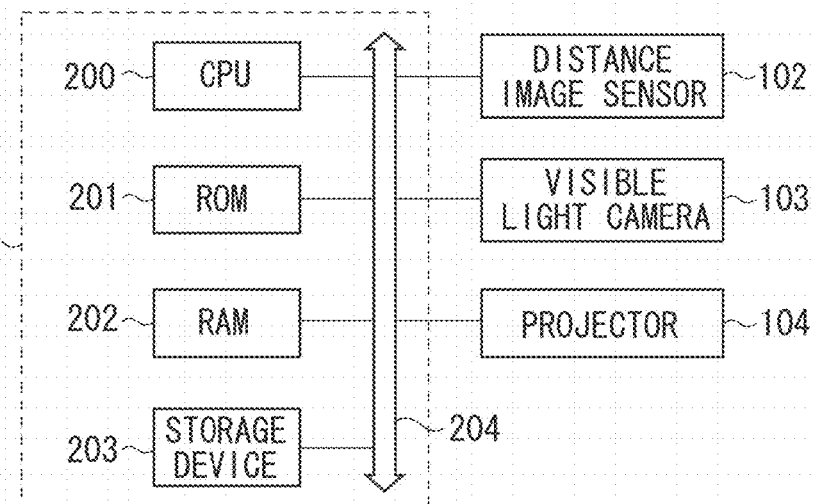
FIGS. 2A, 2B, and 2C are block diagrams illustrating a hardware configuration and functional configurations of the information processing apparatus, respectively.

FIG. 2A illustrates a hardware configuration of the tabletop interface that includes the information processing apparatus 100 according to the present exemplary embodiment. A central processing unit (CPU) 200 can execute control programs of the information processing apparatus 100 to perform calculations and logical determinations for various types of processing and can control each constituent element connected to a system bus 204. A read only memory (ROM) 201 is a program memory, which can store programs relating to controls, including various types of processing procedures, to be performed by the CPU 200. A random access memory (RAM) 202 is usable as a work area for the CPU 200, a data saving area during error processing, or a control program loading area. A storage device 203 is a hard disk drive or an attached external storage device that stores data and programs according to the present exemplary embodiment. The storage device 203 stores various data that can be used by the information processing apparatus 100.

In the present exemplary embodiment, each of the visible light camera 103, the range image sensor 102, and the projector 104 is an external device that is connected to the information processing apparatus 100 via an input/output interface. Each external device can cooperate with the information processing apparatus 100 to constitute an information processing system. However, the visible light camera 103, the range image sensor 102, and the projector 104 can be integrated with the information processing apparatus 100.

Figure 2B:
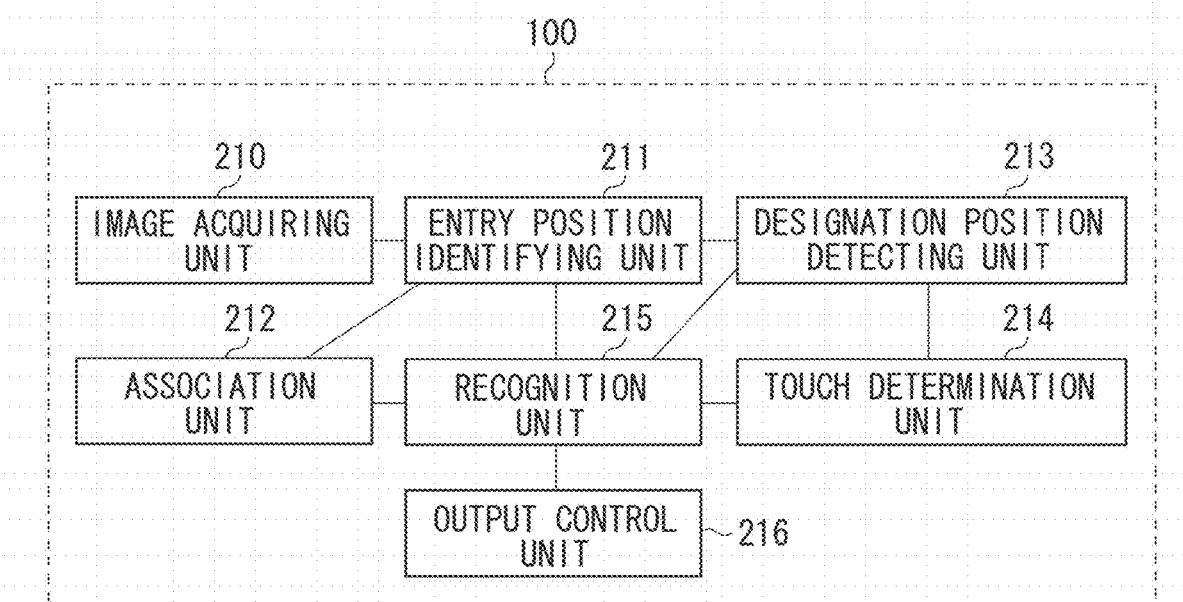

FIG. 2B is a block diagram illustrating an example of a functional configuration of the information processing apparatus 100 according to the present exemplary embodiment. The information processing apparatus 100 includes an image acquiring unit 210, an entry position identifying unit 211, an association unit 212, a designated position detecting unit 213, a touch determination unit 214, a recognition unit 215, and an output control unit 216. To realize the above-mentioned functional units, the CPU 200 can load a program from the ROM 201 to the RAM 202 and perform processing according to each flowchart described below. Further, for example, instead of causing the CPU 200 to perform software processing, it may be useful to employ a hardware configuration. In this case, the hardware configuration can include a calculation unit and a circuit corresponding to the processing of respective functional units.

The image acquiring unit 210 can acquire range images captured by the range image sensor 102, as input images, at predetermined time intervals and can occasionally store the acquired range images in the RAM 202. Further, in the present exemplary embodiment, the image acquiring unit 210 can acquire a visible light image captured by the visible light camera 103 together with the range image at the same timing as the range image is acquired or at the required timing. Both of the range image and the visible light image acquired in this manner include the entire region of the operation surface 101 and share the same coordinate positions. More specifically, in a case where a coordinate position is identified in a range image, it is feasible to search for the same position in the visible light image based on the identified coordinate values. In practice, a signal corresponding to image data is acquired by the image acquiring unit 210 and actually transmitted to and received from each functional unit. However, the image acquiring unit 210 is simply described as "acquiring images" in the following description.

The entry position identifying unit 211 can analyze input images acquired by the image acquiring unit 210, extract at least one hand area, and store information about shape and/or position of the extracted hand area in the RAM 202 while associating them with identifiers thereof. In the present exemplary embodiment, a human hand is the entire portion extending from a shoulder to a fingertip of a human body. In the present exemplary embodiment, the hand area is a partial area of an input image in which at least a part of a portion corresponding to a hand is included. Further, the entry position identifying unit 211 can acquire coordinate values of each entry position at a time when each hand area is initially detected.

The association unit 212 can acquire coordinates of respective entry positions for all extracted hand areas and can associate a plurality of hands estimated as the hands of a single person based on a positional relationship between the extracted hand areas. Especially, in the present exemplary embodiment, if the distance between entry positions of two of the plurality of hands is smaller than a threshold being set beforehand, the two hands can be regarded as both hands of a single person with a higher possibility. More specifically, the association unit 212 selects a combination of extracted hands areas that is shorter in the distance between entry positions. If the distance between the entry positions is shorter than the threshold distance determined beforehand, the association unit 212 associates the combined hand areas with each other. In other words, the association unit 212 identifies a combination of entry positions that has the shortest distance between them among the distances between all combinations of entry positions for all extracted hand areas and shorter than the predetermined distance, and associates the hand areas with each other. In this case, it is desired that the threshold is a value comparable to a shoulder width of an ordinary person, which can be determined considering an average adult size. Then, the association unit 212 allocates information indicating the above-mentioned mutually associated result to an identifier of the hand area stored in the RAM 202.

The designated position detecting unit 213 can detect a position designated by a hand based on the shape of each extracted hand area and can store three-dimensional coordinates of the designated position in the RAM 202. In the present exemplary embodiment, the designated position detecting unit 213 detects a pixel included in the hand area that is farthest from the imageable border as the designated position. For example, in a case where a user stretches only a forefinger to indicate a "pointing posture", the designated position detecting unit 213 detects a pointed tip of the forefinger as the designated position.

The touch determination unit 214 can determine whether the operation surface 101 has been touched by a hand corresponding to the designated position by comparing a z-coordinate value of the identified designated position with a predetermined height threshold. For example, when a fingertip is present within 1 cm from the operation surface 101, it can be defined that the fingertip is in contact with the operation surface 101. The touch determination unit 214 performs threshold processing on the coordinate values, while setting the height threshold to be 1 cm.

The recognition unit 215 can recognize a touch operation or a gesture operation having been input by a user based on the shape of a hand area, coordinates of a designated position, and a determination result obtained by the touch determination unit 214. In the present exemplary embodiment, the recognition unit 215 can recognize an operation constituting one instruction performed by cooperative movements of a plurality of hands (or styluses). In particular, the recognition unit 215 recognizes predetermined multi-touch operations performed as cooperative operations by a plurality of hands.

The output control unit 216 generates a display image to be projected by the projector 104 based on information stored in the ROM 201 or in the storage device 203. The output control unit 216 notifies each functional unit responding to a user operation of a recognition result of the operation.

Next, touch operation recognition processing that can be performed by the information processing apparatus 100 according to the present exemplary embodiment will be described in detail below with reference to a flowchart illustrated in FIG. 3. In the present exemplary embodiment, the information processing apparatus 100 repeats the processing of the flowchart illustrated in FIG. 3 in response to each input of an image from the range image sensor 102 at predetermined periods. The predetermined period is, for example, 30 frames per second or 15 frames per second.

In step S300, the image acquiring unit 210 initializes the work area of the RAM 202, acquires a range image captured by the range image sensor 102 as an input image, and stores the input image (i.e., the acquired range image) in the RAM 202.

In step S301, the entry position identifying unit 211 extracts at least one hand area from the input image and stores information about the extracted hand area in the RAM

202. In the present exemplary embodiment, the entry position identifying unit 211 extracts an area having a z-coordinate value greater than the height of the operation surface 101 as a hand area by performing threshold processing on the z-coordinate value of each pixel of the range image acquired as an input. However, the extraction method is not limited to the above-mentioned example. For example, it is useful to extract a portion corresponding to a flesh color area by analyzing RGB values of an additionally captured visible light image.

In step S302, the entry position identifying unit 211 determines whether the hand area extracted in step S301 includes a hand that has just entered the space on the operation surface 101, by referring to the information stored in the RAM 202. If information about hand areas that can be regarded as a single person's hands are not yet stored in the RAM 202, the entry position identifying unit 211 determines that the hand has just entered the space because the hand area has first entered into a range image of the latest frame processed after the initialization. If the entry position identifying unit 211 determines that a hand that has just entered the space is present (Yes in step S302), the operation proceeds to step S303. On the other hand, if the entry position identifying unit 211 determines that there is not any hand that has just entered the space (No in step S302), the operation proceeds to step S306.

In step S303, the entry position identifying unit 211 selects a hand area corresponding to the hand that has just entered as a processing target.

In step S304, the entry position identifying unit 211 detects an intersectional region where the selected hand area crosses with the imageable border and acquires xy coordinates representing an entry position based on the detected intersectional region. In the present exemplary embodiment, the entry position identifying unit 211 calculates average values of coordinates of the pixels included in the hand area that contacts the imageable border, as coordinates of the entry position, as indicated by the point 110 illustrated in FIG. 1B.

In step S305, the association unit 212 performs association processing for new hand areas being currently selected. The association processing to be performed in step S305 will be described in detail below.

In step S306, the designated position detecting unit 213 detects a designated position for each of the extracted hand areas. If a hand is in a state where a fingertip is stretched, the designated position to be detected by the designated position detecting unit 213 is the fingertip. For example, if a user makes a fist, the designated position is a specific point of the edge portion farthest from the imageable border.

In step S307, the touch determination unit 214 determines whether the operation surface 101 is presently touched by any one of hands corresponding to the extracted hand areas based on the z-coordinate value of the identified designated position and a predetermined threshold. In the present exemplary embodiment, the touch determination unit 214 determines that the operation surface 101 is presently touched by a hand if the z-coordinate value of the designated position is less than the height threshold (i.e., a referential height from the operation surface 101). If the touch determination unit 214 determines that the operation surface 101 is presently touched (Yes in step S307), the operation proceeds to step S308. If it is determined that the operation surface 101 is not presently touched (No in step S307), the information processing apparatus 100 terminates the processing of the flowchart illustrated in FIG. 3. Alternatively, the information processing apparatus 100 can perform processing for recognizing a gesture operation based on the shape of the hand area or the locus of the designated position.

In step S308, the recognition unit 215 determines whether the hands being in touch with the operation surface 101 are both of the hands associated in the processing performed in step S305, by referring to the information stored in the RAM 202. If the recognition unit 215 determines that the operation surface 101 is presently touched by both of the associated hands (Yes in step S308), the operation proceeds to step S309. If the recognition unit 215 determines that the operation surface 101 is not presently touched by both of the associated hands (No in step S308), the operation proceeds to step S310.

In step S309, the recognition unit 215 recognizes a multi-touch operation having been performed by a pair of hands of a single user and notifies the output control unit 216 of the recognized content. For example, the recognition unit 215 acquires a difference between consecutive frames with respect to the distance between two designated positions being in the touch state. If the distance becomes shorter, the recognition unit 215 recognizes the input operation as a "pinch-in operation". If the distance becomes longer, the recognition unit 215 recognizes the input operation as a "pinch-out operation". The pinch-in operation is often used when a user instructs reducing an image. The pinch-out operation is often used when a user instructs enlarging an image. Further, the recognition unit 215 acquires a difference between consecutive frames with respect to the angle of a straight line passing through two designated positions being in the touch state. In this case, the recognition unit 215 can recognize an input of "right rotation operation" or "left rotation operation" based on a change direction of the angle. These operations are often used when a user instructs right rotation or left rotation of an image. When the output control unit 216 receives a notification, the output control unit 216 generates a display image reflecting a response to the operation and outputs the generated image to the projector 104.

In step S310, the recognition unit 215 recognizes a single touch operation and notifies the output control unit 216 of the recognized content. For example, the recognition unit 215 traces a designated position being in the touch state for several frames and identifies the shape of its locus. Then, the recognition unit 215 issues a command that corresponds to the identified shape. For example, the recognition unit 215 can recognize an instruction and respond in such a way as to delete an item displayed beneath the locus if the locus shape is "V shape" or copy an item displayed beneath the locus if the locus shape is "round shape".

If a meaningful operation cannot be recognized during a predetermined period of time or despite of acquisition of a predetermined number of frames, the information processing apparatus 100 terminates the processing of the flowchart illustrated in FIG. 3 without performing the processing in step S309 or step S310. The multi-touch operation and the single touch operation to be recognized in steps S309 and S310 are mere examples. After completing the above-mentioned processing, the information processing apparatus 100 repeats the same processing on an input image acquired in the subsequent cycle.

Next, the association processing to be performed in step S305 illustrated in FIG. 3 will be described in detail below with reference to a flowchart illustrated in FIG. 4A. In the association processing according to the present exemplary embodiment, it is assumed that a distance between respective hands (corresponding to a distance between standing positions of respective users) is sufficiently far in a case where the table top system is used by a plurality of users. The association unit 212 selects a combination of hands that has the shortest distance between them among the distances between all combinations of the entry positions and determines whether the selected hands are a pair of hands of a single user by checking if the distance is comparable to the shoulder width of a single person.

In step S400, the association unit 212 acquires a distance between entry positions for non-associated hand areas. In a case where the number of non-associated hand areas is three or more, the association unit 212 acquires the distance for all combinations of selected hand areas.

In step S401, the association unit 212 selects a combination of two hands that is shortest in the distance between entry positions thereof from all combinations acquired in step S400.

In step S402, the association unit 212 determines whether the distance between two entry positions is shorter than a threshold distance determined beforehand, with respect to the selected combination of two hands. If the association unit 212 determines that the distance between two selected entry positions is shorter than the predetermined threshold distance (Yes in step 402), the operation proceeds to step S403. If the association unit 212 determines that the distance between two selected entry positions is equal to or longer than the predetermined threshold distance (No in step 402), the association unit 212 restarts the touch operation recognition processing. For example, a practical value of the threshold is 40 cm. However, it is useful to set the threshold with reference to an average shoulder width, an operation surface size, or a user-defined optimum value. In such a case, the determination to be performed when the distance between two selected entry positions coincides with the threshold can be appropriately set.

In step S403, the association unit 212 associates the hands of the selected combination (i.e., the combination determined as being shorter than the threshold with respect to the distance between two selected entry positions) with each other, and stores the information about the associated hands in the RAM 202. Then, the association unit 212 restarts the touch operation recognition processing. For example, the association unit 212 stores the information about the associated hands while associating their identifiers with each other or newly associating the identifiers of the associated pair. The information processing apparatus 100 deletes the information stored in the RAM 202 when the corresponding hand exits from the operation surface and disappears from the range image.

Figure 4A:
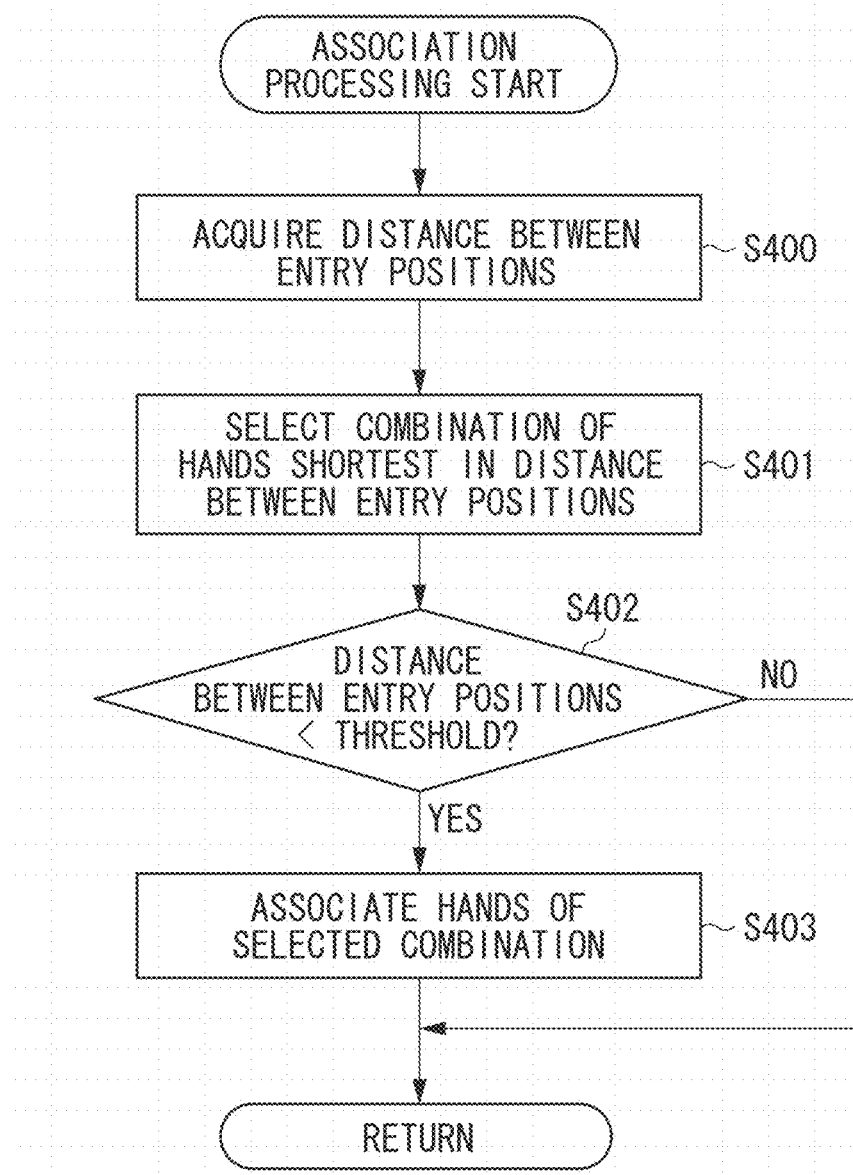

In the flowchart illustrated in FIG. 4A, if it is determined that the distance between two selected entry positions is shorter than the predetermined threshold distance, the association unit 212 determines that the processing target combination is a pair of hands of a single user. In this case, it is useful to set another threshold and determine that the processing target combination is not a pair of hands of a single user if the distance between two selected entry positions is excessively short. For example, in a case where the operation surface is small and neighboring users are positioned adjacent to each other, there will be the possibility that a left hand of a user positioned on the right side and a right hand of a user positioned on the left side are extremely close with respect to appearance position. On the other hand, it is unnatural that a user uses both hands on the operation surface if the distance between entry positions of the hands is extremely shorter compared to the shoulder width. Accordingly, for example, if the distance between two selected entry positions is shorter than 20 cm, the association unit 212 may determine that the processing target combination is unrelated hands of a plurality of users.

As mentioned above, according to the present exemplary embodiment, the association unit 212 estimates that the processing target hands will be a pair of hands of a single user if the positional relationship between hand entry positions is a distance comparable to the shoulder width of a single user. Accordingly, even in a system that does not use any touch panel capable of detecting a touch operation, it is feasible to discriminate and recognize a multi-touch input by a single user or unrelated inputs by a plurality of users when there is a plurality of designated positions. Further, even in a system that cannot detect a user's head or the position of a moving portion and cannot directly identify the user position, it is feasible to discriminate whether a plurality of detected hands is a pair of hands of a single user or unrelated hands of a plurality of users.

In the description of the flowcharts illustrated in FIGS. 3 and 4A, the information processing apparatus 100 extracts hand areas and identifies entry positions and designated positions based on range images. However, the processing to be performed by the information processing apparatus 100 is not limited to the above-mentioned examples. The effects of the present exemplary embodiment will be similarly obtained even when the information processing apparatus 100 performs the above-mentioned processing based on visible light images.

Further, in the first exemplary embodiment, the information processing apparatus 100 constantly performs the association processing regardless of the pose of each user's hand and recognizes a multi-touch operation if hands can be associated. However, it is useful that the information processing apparatus 100 additionally perform processing for recognizing the pose based on a comparison between the shape of each hand area and dictionary data. In this case, for example, the information processing apparatus 100 can be configured to perform the association processing if a "pointing pose" (i.e., a state where only a forefinger of a hand is stretched) is detected, or when the "pointing pose" of both hands is detected, and recognize a multi-touch operation. Adding the above-mentioned processing is useful to reduce the entire calculation load for the association processing because unnecessarily performing the association processing can be prevented.

In the first exemplary embodiment, the information processing apparatus 100 performs sequential processing based on extraction of each hand area because it is presumed that respective operations are performed by hands of users. However, the present exemplary embodiment is applicable even in a case where an appropriate tool (such as a stylus) is employed. In a case where a user performs a touch operation with an object other than a hand, the entry position identifying unit 211 can extract an area including the object, if it is present at a position higher than the operation surface 101 and is in contact with the imageable border, from a range image and can process the extracted area as a pseudo hand area in the above-mentioned processing.

In a second exemplary embodiment, the information processing apparatus 100 performs additional processing for checking appropriateness of the association processing by comparing images of hands associated based on hand position conditions at an operation start timing.

A system configuration and a hardware configuration of the information processing apparatus 100 according to the second exemplary embodiment are similar to those of the first exemplary embodiment illustrated in FIGS. 1A, 1B and 2A. Therefore, redundant description thereof will be avoided.

Figure 2C:
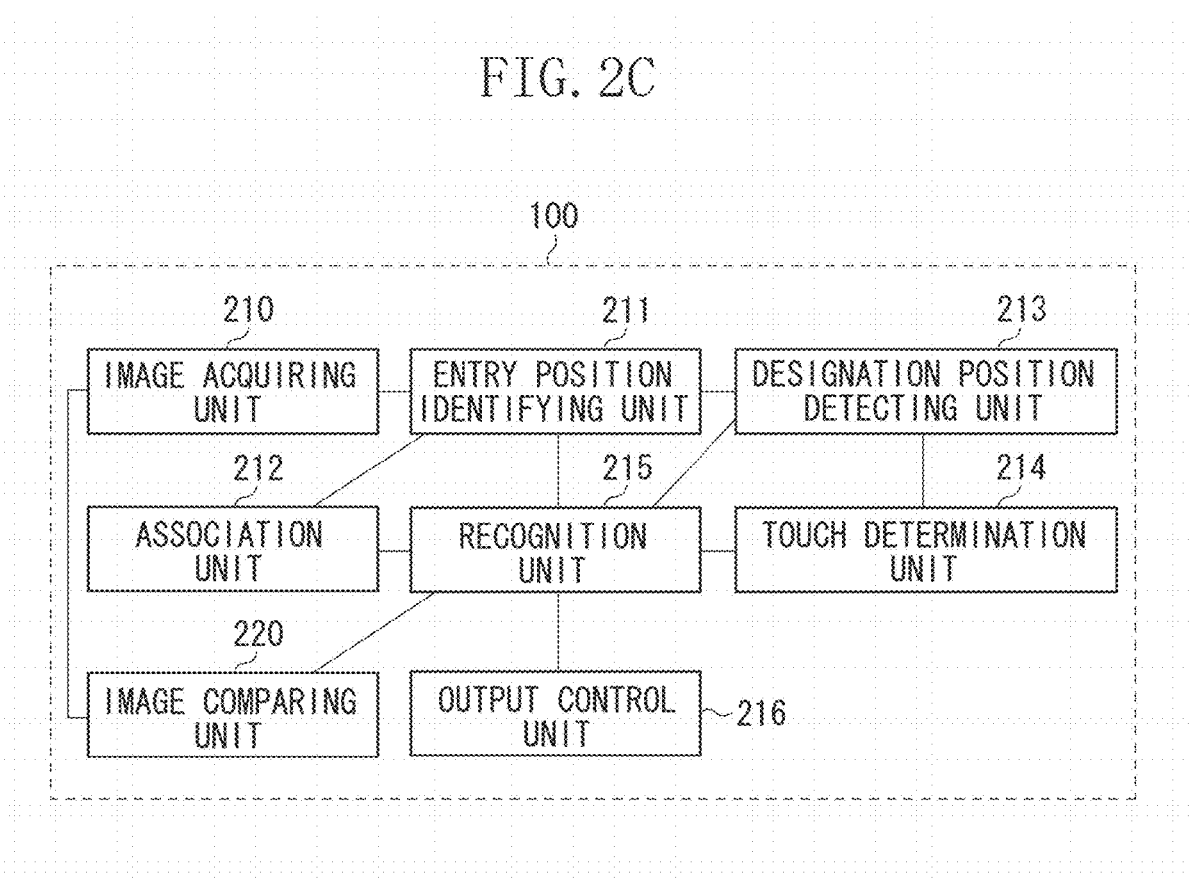

FIG. 2C is a view illustrating a functional configuration of the information processing apparatus 100 according to the second exemplary embodiment. The second exemplary embodiment is different from the first exemplary embodiment in that an image comparing unit 220 is newly added. The image comparing unit 220 can compare features detectable from images of the hands associated by the association unit 212 and acquire differences in features. In the present exemplary embodiment, the features detectable from respective images include a size of a portion extending distally from a wrist, a color of flesh, a color of sleeve, and a direction angle of arm. Similar to other functional units, the image comparing unit 220 is a functional unit that can be realized by the CPU 200 that loads a related program from the ROM 201 to the RAM 202 and performs processing according to a flowchart described below.

The information processing apparatus 100 according to the present exemplary embodiment performs processing for recognizing a touch operation according to a processing procedure that is similar to that described in the first exemplary embodiment with reference to the flowchart illustrated in FIG. 3. However, the second exemplary embodiment is different in that the information processing apparatus 100 performs the association processing (i.e., the processing performed in step S305 illustrated in FIG. 3) according to a flowchart illustrated in FIG. 4B. The flowchart illustrated in FIG. 4B includes processing steps similar to those of the flowchart illustrated in FIG. 4A. Similar processing steps are denoted by the same reference number and redundant description thereof will be avoided. The flowchart illustrated in FIG. 4B is different from the flowchart illustrated in FIG. 4A in that the image comparing unit 220 performs image comparison processing in step S404 after the association processing has been performed by the association unit 212 in step S403. Further, the flowchart illustrated in FIG. 4B is different from the flowchart illustrated in FIG. 4A in that step S405 is added.

Figure 5:
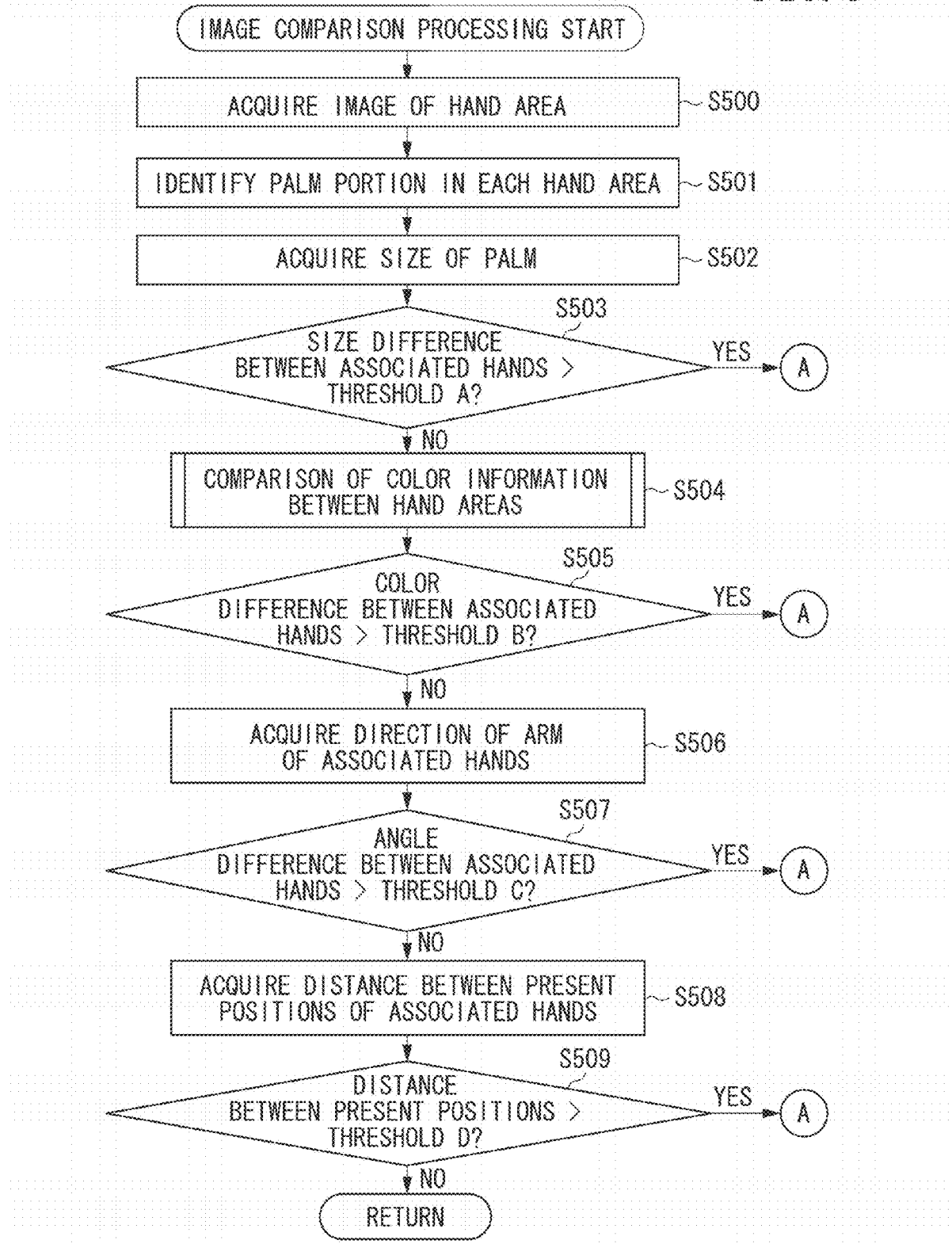
FIG. 5 is a flowchart illustrating an example flow of image comparison processing that can be performed by the information processing apparatus.

FIG. 5 is a flowchart illustrating an example flow of the image comparison processing to be performed in step S404. In step S500, the image acquiring unit 210 acquires a visible light image of each hand area. The image acquiring unit 210 secures the work area of the RAM 202 and acquires the visible light images captured by the visible light camera 103. Then, the image acquiring unit 210 identifies a portion corresponding to the hand area extracted in step 301 and acquires image data of the identified portion. The visible light images can be acquired appropriately during the processing to be performed in step S501 or can be captured and buffered at predetermined time intervals.

In step S501, the image comparing unit 220 identifies a portion extending distally from a wrist for each hand area. In the present exemplary embodiment, the portion extending distally from the wrist includes five fingers in addition to the back and the palm of a hand. For example, the image comparing unit 220 can identify a predetermined partial region of each hand area positioned far from the imageable border as the portion extending distally from the wrist. Further, the image comparing unit 220 can recognize the shape of each hand area to identify the centroid (or center) of five fingers or the portion extending distally from the wrist and can identify a peripheral region as the portion extending distally from the wrist.

In step S502, the image comparing unit 220 acquires information about the size of the portion extending distally from the wrist. More specifically, the image comparing unit 220 obtains the area size represented by the number of pixels included in an image area identified as the portion extending distally from the wrist. Further, in the present exemplary embodiment, the image comparing unit 220 performs normalization processing with reference to the shape of the portion extending distally from the wrist of a person known beforehand as well as standard area size. Then, the image comparing unit 220 acquires a normalized value (e.g., 0 to 100) representing the size of the portion extending distally from the wrist for each hand area. The above-mentioned normalization processing is useful to prevent a situation that the portion extending distally from the wrist is different in shape (i.e., pose) from being erroneously determined in such a way as to recognize any difference in size. However, in a case where the image comparing unit 220 refers to the area size of the portion extending distally from the wrist, the back (or the palm) portion of the hand can be identified as a processing target. Similarly, the whole or a predetermined part of an arm can be identified as a target.

The image comparing unit 220 constantly performs the processing in steps S501 and S502 for each combination of the associated hands. On the other hand, the image comparing unit 220 can skip both of steps S501 and S502 for the remaining hands that are not yet associated. In a case where the size of each non-associated hand is acquired, the image comparing unit 220 can determine a combination of candidates to be next associated considering the similarity in size.

In step S503, the image comparing unit 220 determines whether a size difference between the associated hands of the processing target combination is greater than a predetermined threshold A. The threshold A can be allocated beforehand or can be learned while the association processing is repeated. If the image comparing unit 220 determines that the size difference between the associated hands is not greater than the predetermined threshold A (No in step S503), the operation proceeds to step S504. On the other hand, if the image comparing unit 220 determines that the size difference between the associated hands is greater than the predetermined threshold A (Yes in step S503), it can be regarded that there is a possibility of the occurrence of erroneous association in the present exemplary embodiment. Therefore, the operation proceeds to step S405. In step S405, the association unit 212 cancels the association of the present processing target combination and selects a new processing target combination that is next shorter in the distance between the entry positions. Then, the association unit 212 restarts the above-mentioned processing for the newly selected combination.

Figure 7A:
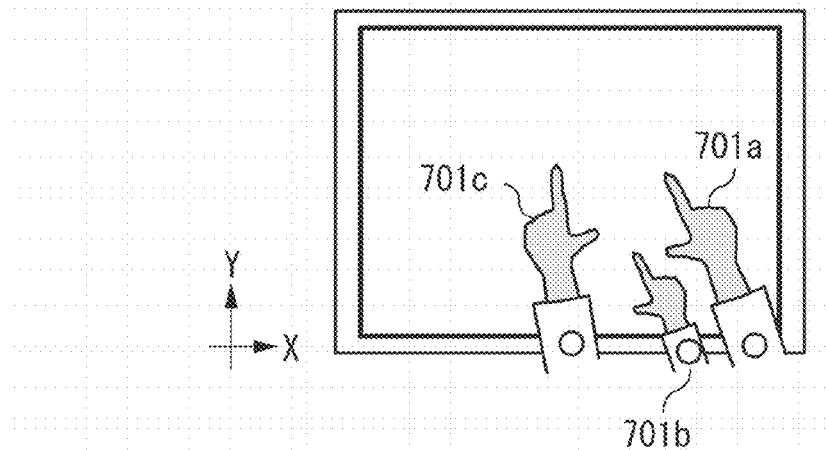
FIGS. 7A, 7B, and 7C illustrate examples of the operation environment of the tabletop interface.

For example, FIG. 7A illustrates an operational state where one hand of a child is present between both hands of an adult. In this case, for example, it is assumed that the size acquired in step S502 with respect to the portion extending distally from the wrist is "100" for each of the hand 701a and the hand 701c and "50" for the hand 701b. Further, it is assumed that the threshold A is 10. In this case, the hand 701a and the hand 701b are a combination of hands that has the shortest distance between them among the distances between the entry positions thereof. However, because the difference between the hand 701a and the hand 701b is large with respect to the size of the portion extending distally from the wrist, the association unit 212 cancels the association processing. The association unit 212 continues the processing until the hand 701a and the hand 701c are associated with each other as a combination. As mentioned above, it is feasible to improve the accuracy of the association by adding the processing for determining appropriateness of the association with reference to the hand area (i.e., one of features detectable from an image).

Figure 6:
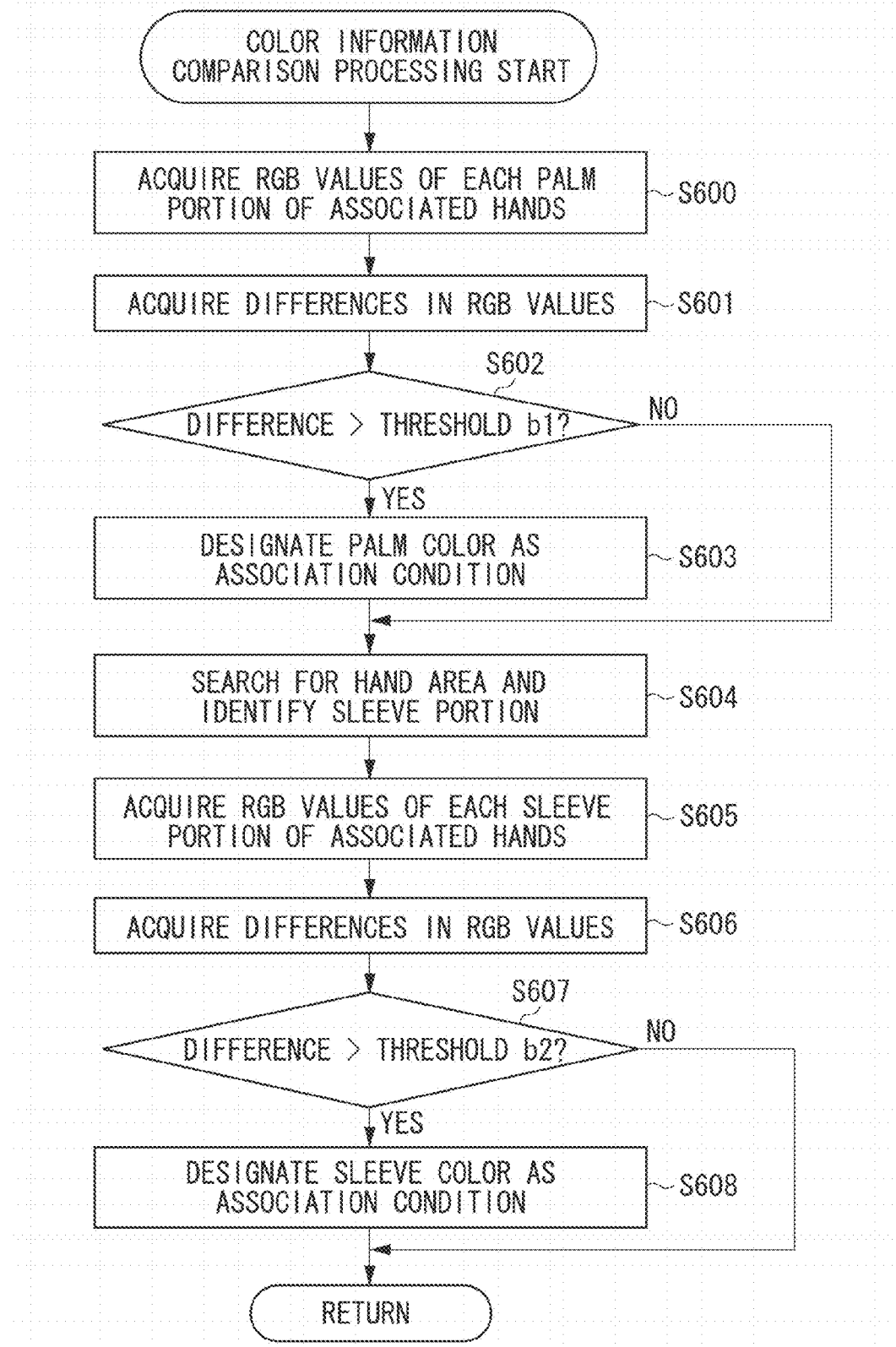
FIG. 6 is a flowchart illustrating an example flow of color information comparison processing that can be performed by the information processing apparatus.

Next, in step S504, the image comparing unit 220 compares processing target hand areas with respect to color information. Hereinafter, color information comparison processing to be performed in step S504 will be described in detail below with reference to a flowchart illustrated in FIG. 6.

In step S600, the image comparing unit 220 acquires RGB values of the identified portion extending distally from the wrist for the associated hand areas of the processing target combination. In step S601, the image comparing unit 220 acquires a difference therebetween in each of the acquired RGB values. In step S602, the image comparing unit 220 determines whether the acquired difference is greater than a threshold b1. If any one of the RGB colors satisfies the condition, the image comparing unit 220 determines that the acquired difference is greater than the threshold b1. Alternatively, an average value of three colors is usable in the above-mentioned determination. If the image comparing unit 220 determines that the acquired difference is greater than the threshold b1 (Yes in step S602), the operation proceeds to step S603. If the image comparing unit 220 determines that the acquired difference is not greater than the threshold b1 (No in step S602), the operation proceeds to step S604.

In step S603, the image comparing unit 220 determines to designate the color of the portion extending distally from the wrist as an associating condition. If the associated hands belong to the same person, it can be estimated that the difference is small with respect to the color of the portion extending distally from the wrist. Accordingly, when the operation proceeds to step S603 after it is determined that the color difference is large at the portion extending distally from the wrist, it can be regarded that there is the possibility of the occurrence of erroneous association. Therefore, the image comparing unit 220 performs determination by weighting the color difference at the portion extending distally from the wrist.

In step S604, the image comparing unit 220 identifies a sleeve portion while searching the associated hand areas of the processing target combination for the portion extending distally from the wrist. For example, the image comparing unit 220 can identify the sleeve portion by checking the shape thereof or by searching for a position at which the color changes steeply. In step S605, the image comparing unit 220 acquires RGB values of each identified sleeve portion. In step S606, the image comparing unit 220 acquires a difference for each of the acquired RGB values. In step S607, the image comparing unit 220 determines whether the acquired difference is greater than the threshold b2. If any one of the RGB colors satisfies the condition, the image comparing unit 220 determines that the acquired difference is greater than the threshold b2. Alternatively, an average value of the three colors is usable in the above-mentioned determination. If the image comparing unit 220 determines that the acquired difference is greater than the threshold b2 (Yes in step S607), the operation proceeds to step S608. If the image comparing unit 220 determines that the acquired difference is not greater than the threshold b2 (No in step S607), the operation proceeds to step S505 illustrated in FIG. 5. In step S608, the image comparing unit 220 determines to designate the sleeve color as an associating condition.

If it is determined that the color difference is large in both of step S602 and step S607, it is useful to appropriately set whether to prioritize the determination in step S603 or the determination in step S608 considering the installation environment of the apparatus and user convenience. If the associated hands belong to the same person, it can be estimated that the difference is small with respect to the sleeve color. On the other hand, the difference may be greatly influenced by the design of each cloth. Accordingly, in the present exemplary embodiment, the image comparing unit 220 prioritizes the determination performed in step S603. The threshold b1 and the threshold b2 can be the same value or can be differentiated considering the environment or the like.

Referring back to the flowchart illustrated in FIG. 5, in step S505, the image comparing unit 220 determines whether the color difference between the associated hands of the processing target combination is greater than a threshold B, with respect to the portion extending distally from the wrist or the sleeve, based on the determination result in step S603 or in step S608. The threshold B is a threshold prepared for determining an apparent difference in color. The threshold B can be allocated beforehand or can be learned while the association processing is repeated. The threshold b1 and the threshold b2 can be different values. If the image comparing unit 220 determines that the color difference between the associated hands is not greater than the predetermined threshold B (No in step S505), the operation proceeds to step S506. On the other hand, if it is determined that the color difference is greater than the threshold B (Yes in step S505), it can be regarded that there is a possibility of the occurrence of erroneous association in the present exemplary embodiment. Therefore, the operation proceeds to step S405.

Figure 7B:
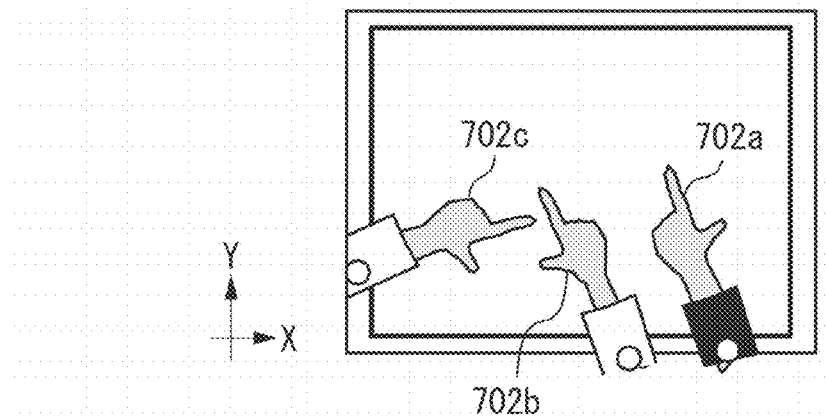

For example, FIG. 7B illustrates an operational state where a right hand of a person wearing white and a left hand of a person wearing black are present adjacently. In this case, for example, the difference between the hand 702a and the hand 702b can be visually recognized in step S502 because the hand 702a and the hand 702b are apparently different in the sleeve color. The hand 702a and the hand 702b are a combination of hands shortest in the distance between entry positions. However, the difference between the hand 702a and the hand 702b is large with respect to the sleeve color, the association unit 212 cancels the association processing. The association unit 212 continues the processing until the hand 702b and the hand 702c are associated with each other as a combination. As mentioned above, it is feasible to improve the accuracy of the association by adding the processing for determining appropriateness of the association with reference to the color (i.e., one of features detectable from an image).

In step S506, the image comparing unit 220 obtains a direction angle of the arm. More specifically, the image comparing unit 220 acquires coordinate values (x1, y1) of a designated position for each hand area. Further, the image comparing unit 220 acquires coordinate values (x2, y2) of a direction reference point. Because a human arm includes a plurality of joints, the definition of the arm direction is greatly variable depending on the setting of the reference point. In the present exemplary embodiment, the reference point identified in step S506 is the center of a cuff. However, the reference point can be an entry position or can be a joint position. In the present exemplary embodiment, the image comparing unit 220 obtains an angle around the x axis using the following formula 1.

$$(\text{Angle}) = \arctan\{(y2-y1)/(x2-x1)\} \qquad \text{(Formula 1)}$$

In step S507, the image comparing unit 220 determines whether the direction angular difference between the associated hands of the processing target combination is greater than a predetermined threshold C. The threshold C can be allocated beforehand or can be learned while the association processing is repeated. Further, an appropriate value can be set for the threshold C according to the reference point used in the calculation of the direction. If it is determined that the direction angular difference between the associated hands is not greater than the threshold C (No in step S507), the operation proceeds to step S508. On the other hand, if it is determined that the direction angular difference is greater than the threshold C (Yes in step S507), it can be regarded that there is a possibility of the occurrence of erroneous association in the present exemplary embodiment. Therefore, the operation proceeds to step S405.

The image comparing unit 220 constantly performs the processing in step S506 for each combination of the associated hands. On the other hand, the image comparing unit 220 can skip step S506 for the remaining hands that are not yet associated. In a case where the direction of each non-associated hand is acquired, the image comparing unit 220 can determine a combination of candidates to be next associated considering the difference in direction.

Figure 7C:
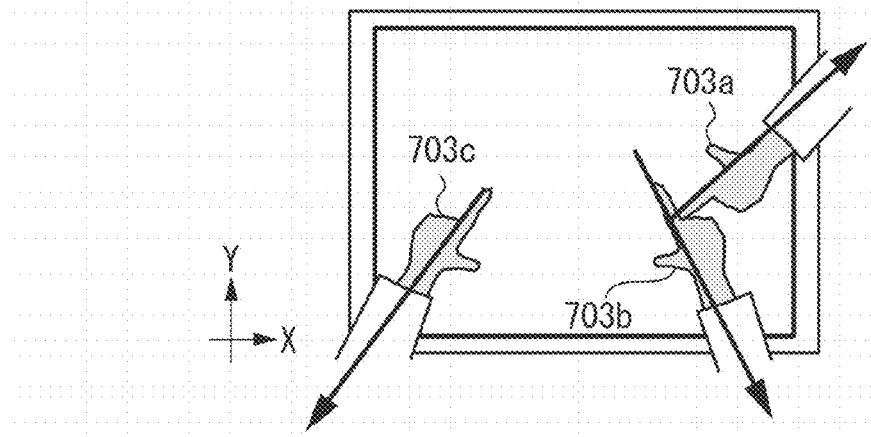

For example, FIG. 7C illustrates an operational state where both hands (i.e., a hand 703c and a hand 703b) spread by the same user and the left hand (i.e., hand 703a) stretched by another user are simultaneously present. In FIG. 7C, an arrow on each hand indicates a straight line passing through the designated position and the reference point that is taken into consideration when the direction is calculated in step S506. In step S506, the image comparing unit 220 obtains a counterclockwise rotational angle around the x axis, as the angle of the illustrated arrow. It is now assumed that the calculated angle of the hand 703a is 45 degrees. The calculated angle of the hand 703b is 310 degrees. The calculated angle of the hand 703c is 230 degrees. Further, it is assumed that the threshold C is 100. In this case, the hand 703a and the hand 703b are a combination of hands shortest in the distance between the entry positions thereof. However, because the difference between the hand 703a and the hand 703b is large with respect to the direction angle, the association unit 212 cancels the association processing. The association unit 212 continues the processing until the hand 703b and the hand 703c are associated with each other as a combination. As mentioned above, it is feasible to improve the accuracy of the association by adding the processing for determining appropriateness of the association with reference to the direction of the hand (i.e., one of features detectable from an image).

Further, in step S508, the image comparing unit 220 acquires the distance between present positions of the associated hands. In the present exemplary embodiment, it is assumed that the present position is an intersection where the hand area crosses with the imageable border in the input image of the latest frame.

In step S509, the image comparing unit 220 determines whether the distance between the present positions of the associated hands of the processing target combination is greater than a predetermined threshold D. The threshold D can be allocated beforehand based on the distance between both hands spread by an ordinary person or can be learned while the association processing is repeated. If it is determined that the distance between the present positions is not greater than the threshold D (No in step S509), the operation returns to the flowchart illustrated in FIG. 3. On the other hand, if it is determined that the distance between the present positions is greater than the threshold D (Yes in step S509), it can be regarded that there is a possibility of the occurrence of erroneous association in the present exemplary embodiment. Therefore, the operation proceeds to step S405.

In the first exemplary embodiment, the information processing apparatus 100 performs association processing based on positional information obtainable at the timing when the hand has been initially detected on the operation surface 101. Therefore, the association result is not influenced by a later movement of each hand. However, according to the second exemplary embodiment, it is feasible to check the movement of a plurality of users in a case where the users are initially positioned adjacently but later separated far from each other, through the determination processing performed in steps S508 and S509. In this case, the information processing apparatus 100 cancels the erroneously performed association processing and continues the processing until another combination of associated hands is obtained. The above-mentioned processing is effective in a system using a large operation surface.

As mentioned above, according to the second exemplary embodiment, it is feasible to improve the accuracy of the association processing. A user can naturally perform a highly flexible operation.

It is unnecessary for the information processing apparatus 100 to perform the above-mentioned processing with reference to all of the conditions, i.e., the size of the portion extending distally from the wrist, the color of the portion extending distally from the wrist or the sleeve, the direction of each hand, and the distance between present positions. The information processing apparatus 100 can be configured to perform the processing with reference to at least one of the above-mentioned conditions, if it is suitable for a usage environment of the information processing apparatus 100. Further, in the present exemplary embodiment, the information processing apparatus 100 performs the above-mentioned various types of processing serially. However, it is also useful to perform the above-mentioned various types of processing in parallel with each other if the information processing apparatus 100 has sufficient processing ability.

Further, the information about the features detectable from an image is a mere example. Any other information about the association condition is usable in addition to the hand position conditions at the operation start timing. For example, if it is possible to identify whether each hand area is a right hand or a left hand based on the shape of the hand area, the information processing apparatus 100 can process a combination of a right hand that is present on the right side of the operation surface and a left hand that is present on the left side of the operation surface based on the positional relationship between the identified right and left hands. Further, it is possible to perform the processing described in the second exemplary embodiment (except for the processing based on the comparison of color information) based on the range image, not the visible light image.

Modified Example

In the first and second exemplary embodiments, the information processing apparatus 100 performs processing for associating a plurality of detected hands as a combination if they can be estimated as a pair of hands of a single user. As a modified example of the present invention, the system can be configured to allow a user to perform a touch operation to spontaneously instruct an association of hands.

A system configuration and a hardware configuration of the information processing apparatus 100 according to the modified example are similar to those of the first exemplary embodiment illustrated in FIGS. 1A, 1B, and FIG. 2B.

Therefore, redundant description thereof will be avoided. However, the recognition unit 215 according to the modified example can recognize a gesture operation of a user when it is spontaneously performed to instruct an association of hands. Further, if desirable, the system according to the modified example can include the configuration described in the second exemplary embodiment. Further, the information processing apparatus 100 can perform touch operation recognition processing according to the above-mentioned flowchart illustrated in FIG. 3. Further, recognition of an association instruction operation according to the modified example can be performed in the single touch operation recognition processing performed in step S310 in the touch operation recognition processing described in the first and second exemplary embodiments.

In the modified example, when a user contacts two fingers used for a multi-touch operation with each other in the touch state, the information processing apparatus 100 associates two hands with each other because of the contact of their fingers.

Figure 9:
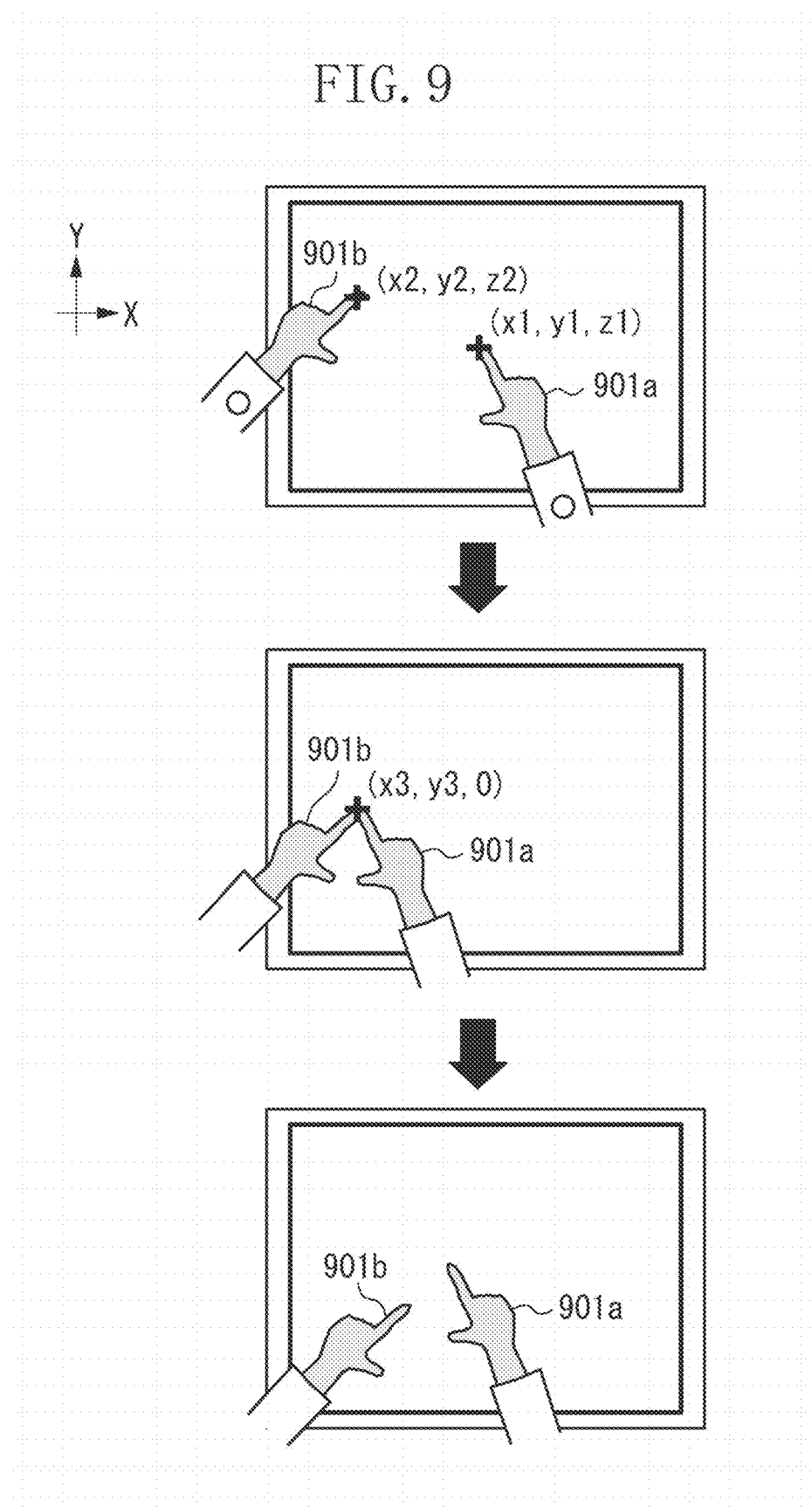
FIG. 9 illustrates an input example of the association instruction.

FIG. 9 illustrates an example of an associating operation, in which the operation advances sequentially from top to bottom. It is assumed that a hand 901a and a hand 901b are not associated because the distance between entry positions thereof is longer than a predetermined threshold. In FIG. 9, a coordinate point (x1, y1, z1) represents a designated position of the hand 901a and a coordinate point (x2, y2, z2) represents a designated position of the hand 901b. In the above-mentioned exemplary embodiment, the designated position detecting unit 213 constantly detects the coordinate values of the designated position for each detected hand area while the information processing apparatus 100 performs the touch operation recognition processing. On the other hand, in the modified example, the information processing apparatus 100 performs processing for associating hand areas only when acquired designated positions of non-associated hand areas can be regarded as being substantially in contact with each other and the contact state has been maintained for a predetermined period of time. For example, when the designated positions of two hands coincide with each other at a coordinate point (x3, y3, 0), the above-mentioned condition can be satisfied. Therefore, the information processing apparatus 100 associates the point 901a with the point 901b. Then, if the distance between two designated positions is later increased, the information processing apparatus 100 recognizes a "pinch-out" operation performed by a user, for example, with intent to instruct enlargement of an image. The above-mentioned operation can be performed not only a single user but also by a plurality of users.

FIG. 8 is a flowchart illustrating an example flow of association instruction detection processing that can be performed by the information processing apparatus 100 in the modified example.

In step S800, the recognition unit 215 acquires a designated position of each non-associated hand area. In step S801, the recognition unit 215 determines whether there are designated positions that are in contact with each other. However, two or more designated positions may be adjacently located in a narrow space (e.g. square of 1 cm×1 cm) even though their coordinate values do not coincide with each other. In such a case, it can be regarded that the designated positions are substantially in contact with each other. The recognition unit 215 can determine that there are designated positions being in contact with each other. The allowable range to be set in this step can be appropriately determined considering the resolution of input images. If the recognition unit 215 determines that there are at least two designated positions that contact with each other (Yes in step S801), the operation proceeds to step S802. If the recognition unit 215 determines that there is not any designated positions that are in contact with each other (No in step S801), the recognition unit 215 repeats the above-mentioned processing. Alternatively, the recognition unit 215 can terminate the processing of the flowchart illustrated in FIG. 8.

In step S802, the recognition unit 215 acquires the length of time during which the designated positions are stationary and in contact with each other, based on a difference between frames of the input image. In step S803, the recognition unit 215 determines whether the acquired time length is greater than a predetermined standby time. For example, the predetermined standby time such as 3 seconds is set beforehand. However, each user can appropriately change the setting value of the standby time. In step S804, the association unit 212 associates the hands with each other if the designated positions thereof are in contact with each other and stores information about the associated hands in the RAM 202, and then terminates the processing of the flowchart illustrated in FIG. 8.

As mentioned above, the information processing apparatus 100 can perform processing for recognizing an association instruction operation. Herein, the association instruction operation is one of touch operations and the information processing apparatus 100 detects a designated position contacted in a touch state. However, the association instruction operation can be a gesture operation performed in the air.

According to the modified example, it is unnecessary for a user to reset the entry position in newly performing an associating operation by once moving a hand to the outside space of the operation surface. Therefore, the user can smoothly perform a sequential work. Further, enabling a user to instruct a touch operation without requiring any menu selection or any mode switching is useful because the user can input an instruction in the operational flow in which the user performs a multi-touch operation. Further, the information processing apparatus 100 can be configured to recognize an association instruction when a single touch operation is input and recognize an association cancellation instruction when a multi-touch operation is input. Further, it is useful to register a specific pattern beforehand as a command instructing the association cancellation processing. For example, the specific pattern performed by a user is drawing a "x shape" by crossing both hands thereof. It is desired that the specific pattern can be apparently discriminated from other multi-touch commands. By using the above-mentioned specific pattern, the user can easily instruct cancelling the association processing.

Other Exemplary Embodiment

The present invention can be realized through the processing that includes supplying a program capable of realizing at least one of the functions of the above-mentioned exemplary embodiments to a system or an apparatus via a network or an appropriate storage medium and causing at least one processor of a computer provided in the system or the apparatus to read and execute the program. Further, the present invention can be realized by a circuit (e.g., ASIC) that can realize at least one of the above-mentioned functions.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

According to the present invention, when a system is configured to recognize an operational input based on a three-dimensional measurement of user's hands, the system can discriminate whether a plurality of detected hands is a pair of hands of a single user or unrelated hands of a plurality of users.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-199181, filed Sep. 29, 2014, which is hereby incorporated by reference herein in its entirety.

What is claimed is:

1. An information processing apparatus comprising:
one or more processors; and
one or more memories storing instructions which, when executed by the one or more processors, causes the apparatus to:
acquire information about an image of a space on an operation surface;
identify a position where each of a plurality of objects to be used for an operational input has entered into the space, based on the acquired information about the image;
identify a combination of a plurality of objects, among the plurality of objects, based on the position identified for each of the plurality of objects, and associate the combined plurality of objects with each other;
extract at least one area including a plurality of objects to be used for the operational input, from periodically acquired images; and
identify an intersectional position where a borderline of an image in which each area has been initially extracted crosses with the area as the position where the object has entered into the space.

2. The information processing apparatus according to claim 1, wherein the one or more processors further causes the apparatus to recognize an operation that corresponds to a single instruction cooperatively input by the plurality of objects based on information about the plurality of positions designated by the associated objects.

3. The information processing apparatus according to claim 2, wherein the single instruction cooperatively input by the plurality of objects, is an instruction that corresponds to a multi-touch operational input by the plurality of objects.

4. The information processing apparatus according to claim 1, wherein an object to be used for the operational input is one hand of a user.

5. The information processing apparatus according to claim 1, wherein the one or more processors further causes the apparatus to identify the combination of the plurality of objects that cooperatively input a single instruction, among the plurality of objects, based on the position identified for each of the plurality of objects and features of respective objects obtained from the acquired image.

6. The information processing apparatus according to claim 5, wherein an object to be used for the operational input is one hand of a user, and the features of the object obtained from the image include at least one of a size, a color, a direction, and a latest position of the hand.

7. The information processing apparatus according to claim 5, wherein the one or more processors further causes the apparatus to identify the combination of the plurality of objects that cooperatively input the single instruction, among the plurality of objects, based on a comparison result with respect to a size of at least a part of a hand acquired from the image, for a combination of hands associated based on the position identified for each of the plurality of objects.

8. The information processing apparatus according to claim 5, wherein the one or more processors further causes the apparatus to identify the combination of the plurality of objects that cooperatively input the single instruction, among the plurality of objects, based on a comparison result with respect to color information acquired from the image, for a combination of hands associated based on the position identified for each of the plurality of objects.

9. The information processing apparatus according to claim 5, wherein the one or more processors further causes the apparatus to identify the combination of the plurality of objects that cooperatively input the single instruction, among the plurality of objects, based on a comparison result with respect to hand direction angular difference acquired from the image, for a combination of hands associated based on the position identified for each of the plurality of objects.

10. The information processing apparatus according to claim 1, wherein the one or more processors further causes the apparatus to identify a combination of a plurality of objects shortest in the distance between the positions identified for respective objects and shorter than a predetermined distance and configured to associate the combined plurality of objects with each other.

11. The information processing apparatus according to claim 1, wherein the operation surface is a table surface that constitutes a tabletop interface system and the one or more processors further causes the apparatus to acquire a range image captured by a range image sensor installed at a position where the range image sensor overlooks the table surface from above.

12. The information processing apparatus according to claim 11, wherein the one or more processors further causes the apparatus to control a visible light camera to capture an image of an object placed on the operation surface and obtain a read image based on the captured image.

13. The information processing apparatus according to claim 1, wherein the operation surface is a table surface that constitutes a tabletop interface system, and the one or more processors further causes the apparatus to acquire a range image captured by a range image sensor installed at a position where the range image sensor overlooks the table surface from above, and to extract an area in which a plurality of objects to be used for the operational input is captured as imaging target object from the range image, based on a distance from the range image sensor to an imaging target object surface of the range image represented by respective pixels of the acquired range image, and information representing the height of the table surface.

14. The information processing apparatus according to claim 1, wherein the one or more processors further causes the apparatus to obtain a length of time during which a plurality of positions designated by a plurality of objects that are not associated is stationary in a state where the plurality of positions is in contact with each other, and recognize the contact as an operation for associating the plurality of objects with each other, based on the length of time having exceeded a predetermined length of time.

15. A control method of an information processing apparatus, comprising:
    acquiring information about an image of a space on an operation surface;
    identifying a position where each of a plurality of objects to be used for an operational input has entered into the space, based on the information about the acquired image;
    identifying a combination of a plurality of objects based on the position identified for each of the plurality of objects and associating the combined plurality of objects with each other;
    extracting at least one area including a plurality of objects to be used for the operational input, from periodically acquired images; and
    identifying an intersectional position where a borderline of an image in which each area has been initially extracted crosses with the area as the position where the object has entered into the space.

16. A computer readable storage medium storing a program for causing a computer, by reading and executing the program, to implement the control method of the information processing apparatus according to claim 15.

17. An information processing apparatus, comprising:
    one or more processors; and
    one or more memories storing instructions which, when executed by the one or more processors, causes the apparatus to:
    acquire information about an image of a space on an operation surface;
    identify a position where each of a plurality of objects to be used for an operational input has entered into the space, based on the information about the acquired image;
    associate objects estimated as a pair of hands of a single user, among the plurality of objects, based on the identified position for each of the plurality of objects;
    extract at least one area including a plurality of objects to be used for the operational input, from periodically acquired images; and
    identify an intersectional position where a borderline of an image in which each area has been initially extracted crosses with the area as the position where the object has entered into the space.

18. The information processing apparatus according to claim 17, wherein the operation surface is a table surface that constitutes a tabletop interface system and the one or more processors further causes the apparatus to acquire a range image captured by a range image sensor installed at a position where the range image sensor overlooks the table surface from above.

19. The information processing apparatus according to claim 17,
    wherein the operation surface is a table surface that constitutes a tabletop interface system, and the one or more processors further causes the apparatus to:
    acquire a range image captured by a range image sensor installed at a position where the range image sensor overlooks the table surface from above;
    extract an area in which a plurality of objects to be used for the operational input is captured as imaging target objects from the range image, based on distance from the range image sensor to an imaging target object surface of the range image represented by respective pixels of the acquired range image and information representing the height of the table surface; and
    discriminate each extracted area and identify an intersectional position where an image in which each area has been initially extracted crosses with the area as the position where the object has entered into the space.

20. A control method of an information processing apparatus, comprising:
    acquiring information about an image capturing a space on an operation surface;
    identifying a position where each of a plurality of objects to be used for an operational input has entered into the space, based on the information about the acquired image;
    associating objects estimated as a pair of hands of a single user based on the position identified for each of the plurality of objects;
    extracting at least one area including a plurality of objects to be used for the operational input, from images periodically acquired by the acquiring; and
    identifying an intersectional position where a borderline of an image in which each area has been initially extracted crosses with the area as the position where the object has entered into the space.

21. A computer readable storage medium storing a program for causing a computer, by reading and executing the program, to implement the control method of the information processing apparatus according to claim 20.

* * * * *